UNITED STATES PATENT OFFICE.

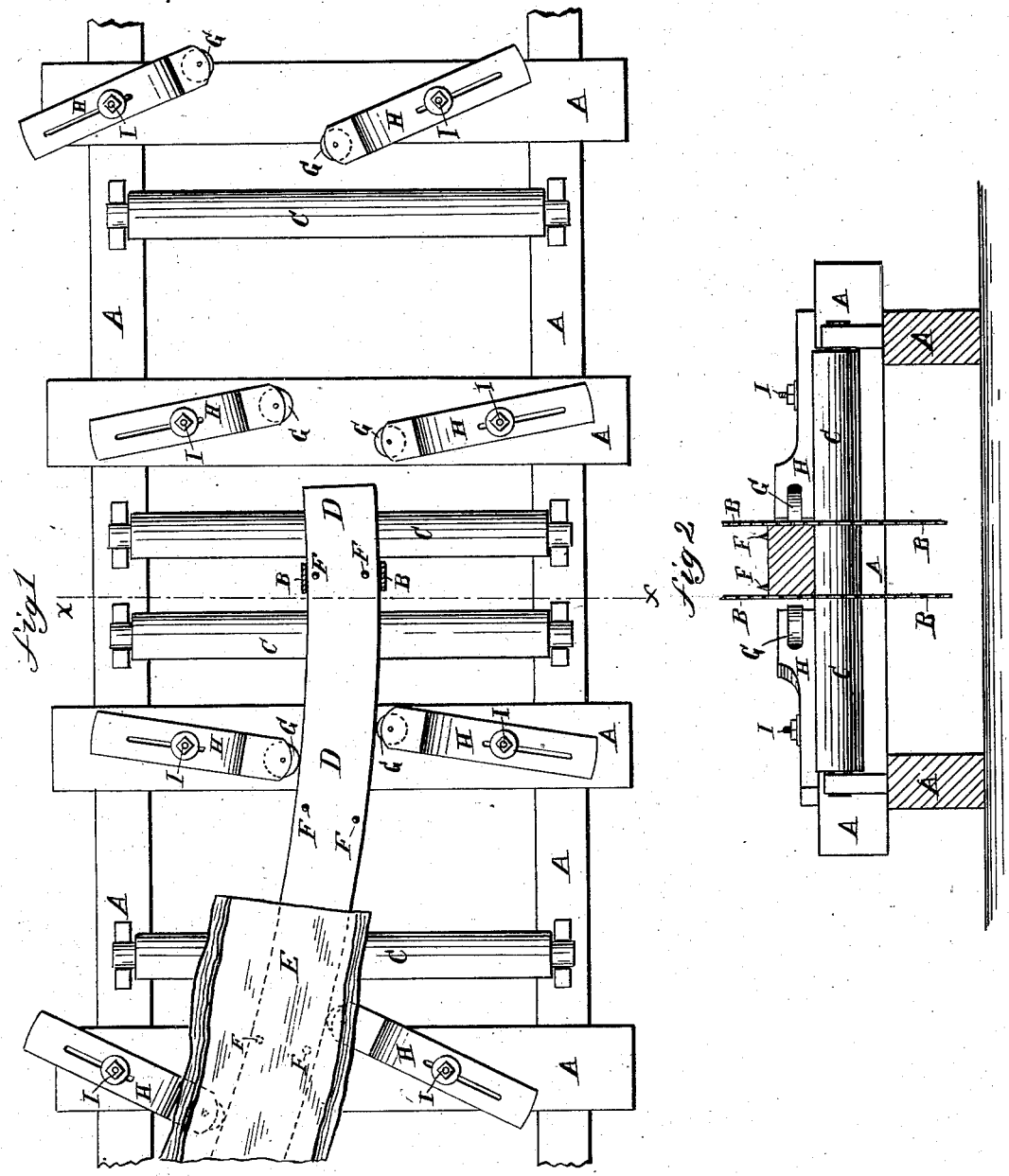

CHARLES S. KING, OF HOUTZDALE, PENNSYLVANIA.

GANG SAWING MACHINE.

SPECIFICATION forming part of Letters Patent No. 261,728, dated July 25, 1882.

Application filed April 28, 1882. (No model.)

*To all whom it may concern:*

Be it known that I, CHARLES SYLVESTER KING, of Houtzdale, in the county of Clearfield and State of Pennsylvania, have invented a new and useful Improvement in Gang Sawing Machines, of which the following is a full, clear, and exact description.

Reference is to be had to the accompanying drawings, forming part of this specification, in which similar letters of reference indicate corresponding parts in both the figures.

Figure 1 is a plan view of my improvement shown as applied to a gang sawing machine. Fig. 2 is a sectional end elevation of the same, taken through the line $x\,x$, Fig. 1.

The object of this invention is to facilitate the "getting out" of arched timbers for bridges and other structures.

The invention consists in a gang sawing machine constructed with a pattern of the desired shape of the timber carried upon the ordinary feed-rollers, and provided with points or spikes to keep the timber in place upon the pattern. The curved pattern is made to move forward in the arc of a circle by guide-rollers attached to adjustable knees, so that the rollers can be readily adjusted to guide a pattern of any desired arc, as will be hereinafter fully described.

A is the frame of a gang sawing machine.

B are the saws, which are connected with the machine and operated in the ordinary manner.

C are the feed-rollers, upon which the timber is fed to the saws B in the ordinary manner.

D is a pattern, which is made of the exact curve required to be given to the timber, and which is placed upon the feed-rollers C and carries the timber E to the saws B. The sides of the timber E are slabbed in the ordinary manner to bring the timber to the required thickness before it is placed upon the pattern D. The timber E is held in place upon the pattern D by the points or spikes F, attached to the pattern D, and which enter the under side of the said timber E, as indicated in Fig. 1. The timber E is designed to be further secured in place upon the pattern D by dogs attached to the ends of the said pattern and driven into the said timber; but the said dogs are not shown in the drawings, as there is nothing new in their construction. The pattern D is guided and made to move forward in the arc of a circle by the rollers G, which rest against its convex and concave sides. The rollers G are pivoted to knees H, which are secured to the cross-bars of the frame A by bolts I. The knees H are slotted longitudinally to receive the bolts I, so that the said knees can be adjusted to bring the rollers G into position to rest against the convex and concave sides of patterns having different radii, so that the timber can be sawed upon the arc of a greater or smaller circle, as may be required.

Heretofore in the common method of getting out arched timber the logs were slabbed in an ordinary sawing-machine. The pattern was then drawn upon the straight sides and the timber was hewed to the lines with a broad-ax to form the convex and concave sides. This hewing required skilled labor, and exact accuracy could never be attained.

By my improvement the labor of hewing is avoided, and the convex and concave sides can be sawed with entire accuracy and as rapidly as the straight sides, thus economizing labor, lessening the cost, and producing more accurate timber.

I am aware that saw-mills have been devised to saw lumber to pattern automatically. I therefore do not claim this as my invention broadly; but What I do claim, and wish to secure by Letters Patent, is—

1. In a gang sawing machine, the combination, with the pattern D, of the rollers G and slotted knees H, substantially as herein shown and described, whereby the said rollers can be readily adjusted to guide patterns of different curves, as set forth.

2. The combination, with the pattern D, spikes F, and saws B, of the guide-rolls G, turning on axes practically parallel to the saw-blades B, and fixed to the saw-bench in arcs of circles corresponding to the form of said pattern, as shown and described.

CHARLES SYLVESTER KING.

Witnesses:
E. C. HUMES, Jr.,
S. H. LICHTEN,
W. A. CHASE.